(12) United States Patent
Bodorin et al.

(10) Patent No.: US 7,620,990 B2
(45) Date of Patent: Nov. 17, 2009

(54) SYSTEM AND METHOD FOR UNPACKING PACKED EXECUTABLES FOR MALWARE EVALUATION

(75) Inventors: Daniel M. Bodorin, Kirkland, WA (US); Adrian M. Marinescu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 780 days.

(21) Appl. No.: 10/769,103

(22) Filed: Jan. 30, 2004

(65) Prior Publication Data

US 2005/0172337 A1 Aug. 4, 2005

(51) Int. Cl.
  *G06F 11/00* (2006.01)
  *G06F 11/30* (2006.01)
(52) U.S. Cl. .................................. 726/24; 713/188
(58) Field of Classification Search ............... 726/22, 726/23, 24; 713/188
  See application file for complete search history.

(56) References Cited

U.S. PATENT DOCUMENTS

| | | | |
|---|---|---|---|
| 6,594,686 B1* | 7/2003 | Edwards et al. ............. 709/203 |
| 6,968,461 B1* | 11/2005 | Lucas et al. .................. 726/22 |
| 7,203,681 B1* | 4/2007 | Arnold et al. .................. 707/7 |
| 2002/0035696 A1* | 3/2002 | Thacker ...................... 713/200 |
| 2003/0014550 A1* | 1/2003 | Fischer et al. ............... 709/310 |
| 2003/0023865 A1* | 1/2003 | Cowie et al. ................ 713/200 |
| 2003/0110391 A1* | 6/2003 | Wolff et al. ................. 713/200 |
| 2003/0115479 A1* | 6/2003 | Edwards et al. ............. 713/200 |
| 2005/0132206 A1* | 6/2005 | Palliyil et al. ............... 713/188 |
| 2005/0172337 A1* | 8/2005 | Bodorin et al. ............... 726/22 |
| 2006/0248582 A1* | 11/2006 | Panjwani et al. ............. 726/13 |

* cited by examiner

*Primary Examiner*—Kambiz Zand
*Assistant Examiner*—Teshome Hailu
(74) *Attorney, Agent, or Firm*—Workman Nydegger (57) ABSTRACT

A system and method for determining whether a packed executable is malware is presented. In operation, a malware evaluator intercepts incoming data directed to a computer. The malware evaluator evaluates the incoming data to determine whether the incoming data is a packed executable. If the incoming data is a packed executable, the malware evaluator passes the packed executable to an unpacking module. The unpacking module includes a set of unpacker modules for unpacking a packed executable of a particular type. The unpacking module selects an unpacker module according to the type of the packed executable, and executes the selected unpacker module. Executing the unpacker module generates an unpacked executable corresponding to the packed executable. The unpacked executable is returned to the malware evaluator where it is evaluated to determine whether the packed executable is malware.

20 Claims, 8 Drawing Sheets

SYSTEM AND METHOD FOR UNPACKING PACKED EXECUTABLES FOR MALWARE EVALUATION

FIELD OF THE INVENTION

The present invention relates to computer security, and more particularly, a system and method for unpacking packed code modules for malware detection.

BACKGROUND OF THE INVENTION

As more and more computers are interconnected through various networks, such as the Internet, computer security also becomes increasingly more important. In particular, computer security in regard to external attacks from malware has become, and continues to become, increasingly more important. Malware, for purposes of the present discussion, is defined as unwanted computer attacks. As such, those skilled in the art will appreciate that malware includes, but is not limited to, computer viruses, Trojan horses, worms, denial of service attacks, abuse/misuse of legitimate computer system functions, and the like. The primary defense against malware is anti-virus software.

Figure 1A:
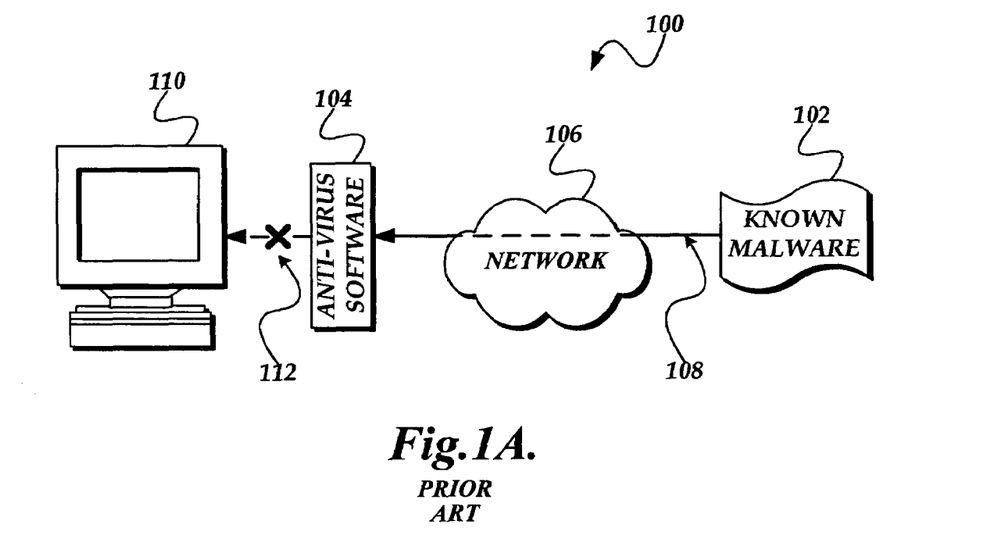
FIG. 1A is a pictorial diagram illustrating how current anti-virus software detects and prevents known malware from reaching and infecting a computer.
Figure 1B:
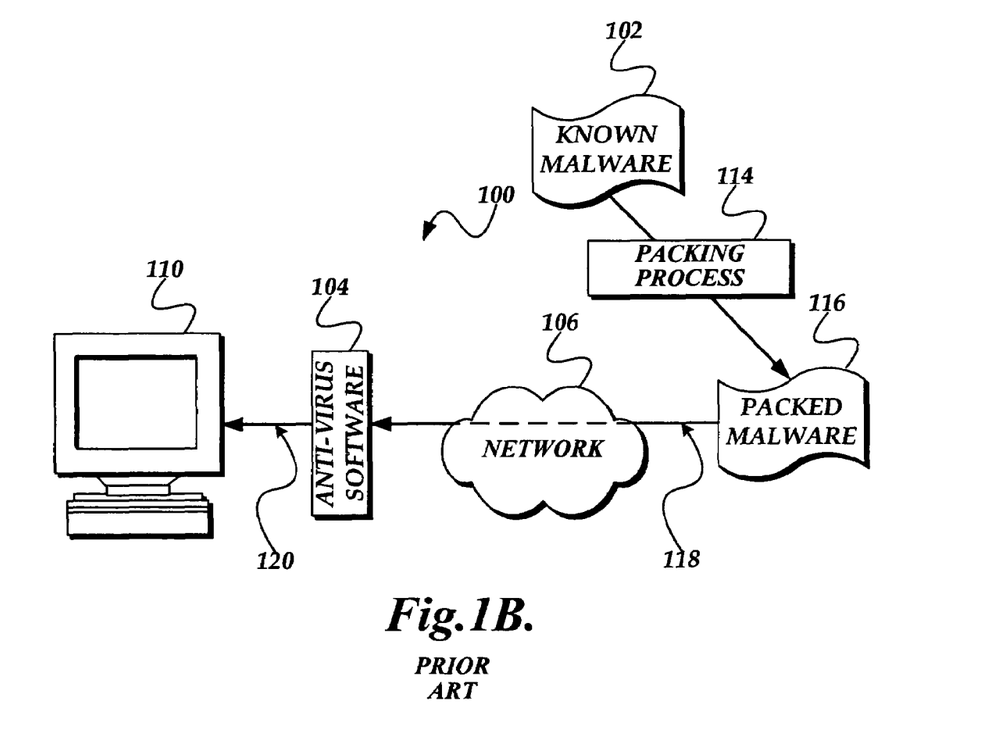
FIG. 1B is a pictorial diagram illustrating how current anti-virus software is unable to prevent packed malware from reaching and infecting the computer.

FIGS. 1A and 1B are pictorial diagrams illustrating how anti-virus software currently operates with respect to malware. In particular, FIG. 1A illustrates how anti-virus software detects known malware, and prevents the known malware from reaching and infecting a computer. Alternatively, FIG. 1B illustrates a common weakness of anti-virus software, particularly, how anti-virus software is unable to detect and prevent modified malware, such as packed malware, from reaching and infecting the computer. What is meant by "reaching" the computer is getting past the anti-virus software. Those skilled in the art will readily recognize anti-virus software almost always resides on the computer it is protecting, and operates on incoming data as it physically arrives at the computer. Thus, while incoming data, including malware, may be located at the computer, for purposes of the present invention, the incoming data does not actually "reach" the computer until it gets past the anti-virus software.

As shown in FIG. 1A, a malware 102 is directed over a network 106 to the computer 110, as indicated by arrow 108. It will be appreciated that the malware 102 may be directed to the computer 110 as a result of a request initiated by the computer, or directed to the computer from another network device. However, as mentioned above, before the known malware 102 reaches the computer 110, anti-virus software 104 installed on the computer intercepts the malware and examines it. As is known in the art, currently, anti-virus software scans the incoming data as a file, searching for identifiable patterns, also referred to as signatures, associated with known malware. If a malware signature is located in the file, the anti-virus software 104 takes appropriate action, such as deleting the known malware/infected file, or removing the malware from an infected file, sometimes referred to as cleaning the file. In this manner, anti-virus software 104 is able to prevent the known malware 102 from infecting the computer 110, as indicated by the arrow 112.

Those skilled in the art will appreciate that almost all unknown malware are actually rewrites or reorganizations of previously released malware. Encountering an absolutely novel malware is relatively rare, as most "new" malware are actually rewrites or rehashes of existing malware. Indeed, it is a simple task for a malicious party to superficially modify the malware, therefore creating "new" malware. The result of the superficial modification is that the static appearance of the malware is altered, though the functionality of the malware often remains the same. Unfortunately, current anti-virus software operates only on known malware. Thus "new," superficially modified malware, while functionally identical to its original/parent malware, is not detected or stopped by the installed anti-virus software 104, due to the anti-virus software's pattern matching system.

One method that is commonly used by malicious parties to modify their malware is often referred to as packing an executable file. Packing an executable file involves encrypting and/or compressing the executable file, and combining the encrypted and/or compressed result with an executable code segment, thereby creating a packed executable file, hereafter referred to more simply as a packed executable. Encrypting and/or compressing files, including executable files, are techniques known in the art. However, while packing an executable file is also known in the art, a brief description of a packed executable may be helpful for understanding aspects of the present invention.

Figure 2:
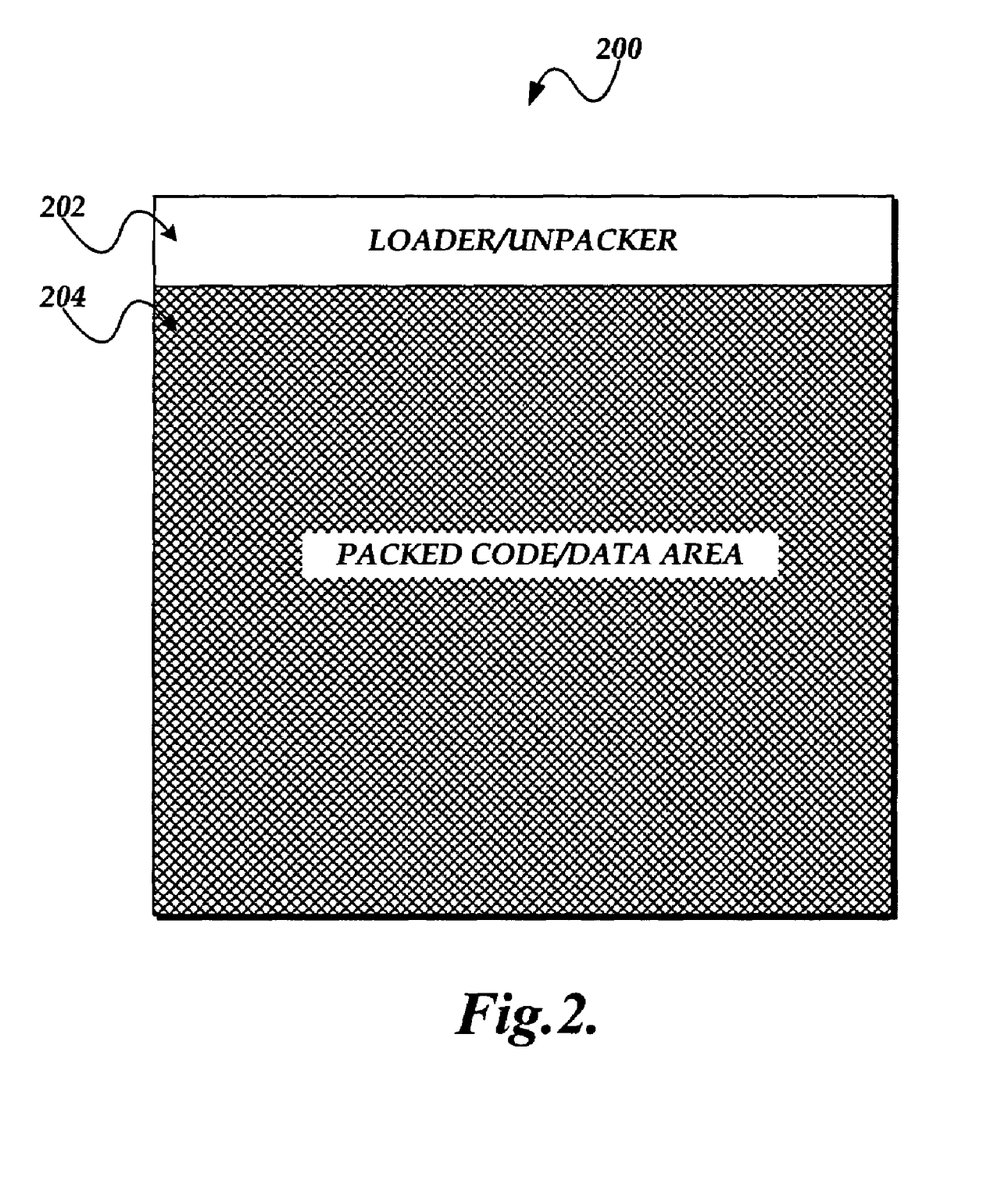
FIG. 2 is a block diagram illustrating an exemplary packed executable, as found in the prior art.

FIG. 2 is a block diagram illustrating an exemplary packed executable. As shown in FIG. 2, a packed executable 200 typically includes two parts: a loader/unpacker area 202, and a packed code/data area 204. As those skilled in the art will appreciate, the packed executable 200 is, of itself, an executable file. The loader/packer area 202 represents the executable portion of the packed executable 200. Alternatively, the packed code/data area 204 represents the "original" encrypted and/or compressed executable file. The purpose of the loader/packer area 202 is, upon execution of the packed executable 200, to restore the packed code/data area to its original, unpacked state, and then to execute the unpacked executable file. Executing the packed executable, i.e., unpacking and executing the packed executable file, is performed seamlessly by the loader/packer area 202. As such, a user may be entirely unaware that an executable is, in fact, a packed executable. Functionally, the result of executing the packed executable is the same as executing the original, unpacked executable.

With reference again to FIG. 1B, FIG. 1B is a pictorial diagram illustrating how current anti-virus software is unable to prevent a packed malware 116 from reaching the computer 110. As shown in FIG. 1B, known malware 102 undergoes a packing process 114, resulting in packed malware 116. As mentioned above, the packed malware 116 will most likely have a different static appearance, though its functionality will be identical. However, because the static appearance is modified, the packed malware 116 is not "known" malware, recognizable by the anti-virus software 104.

The packed malware 116 is directed through the network 106 to the computer 110, as indicated by arrow 118. As described above, the anti-virus software 104 attempts to identify the packed malware 116 to determine whether it is known malware and should be stopped. As the packed malware 116 is, as yet, an unknown modification, and because the signature of the packed malware is not the same as the original malware 102, the anti-virus software 104 fails to identify the packed malware as malware, and permits it to reach the computer 110, as indicated by arrow 120. Upon reaching the computer 110, the packed malware 116 is able to perform its destructive purpose. It is only after an anti-virus software provider identifies a signature pattern for the packed malware 116, and then updates the anti-virus software 104, that the anti-virus software can protect the computer 110 from the packed malware 116.

Constantly evaluating unknown malware to determine a static signature and then updating anti-virus software with that signature is a costly process. It is also inefficient, especially when considering that most malware are only superficially, not functionally, modified from their parents such as the case with packed executables. Thus, it would be beneficial if packed executables could be unpacked in order to determine whether the unpacked executable is malware in disguise.

In light of the above-identified problems, it would be beneficial to computer users, both in terms of computer security and in terms of cost effectiveness, to provide an extensible unpacker module that operates in conjunction with anti-virus software or other malware detection systems, so that packed malware may be recognized for what it is. The present invention addresses this and other issues found in the prior art.

SUMMARY OF THE INVENTION

According to aspects of the present invention, a system for determining whether a packed executable is malware is presented. The system includes a malware evaluator that determines whether incoming data is malware. The system also includes an unpacking module for unpacking a packed executable. In operation, upon intercepting incoming data, the malware evaluator determines whether the incoming data is a packed executable. If the incoming data is a packed executable, the malware evaluator provides the packed executable to the unpacking module. The unpacking module returns an unpacked executable corresponding to the packed executable. Upon receiving the unpacked executable from the unpacking module, the malware evaluator determines whether the unpacked executable is malware.

According to other aspects of the present invention, a system for unpacking a packed executable for evaluation as malware is presented. The system includes a set of unpacker modules comprising at least one unpacker module. Each unpacker module in the set of unpacker modules corresponds to executable code for unpacking a particular type of packed executable. The system also includes an unpacking manager. Upon obtaining a packed executable, the unpacking manager selects an unpacker module from the set of unpacker modules to unpack the packed executable according to the type of the packed executable. The unpacking manager then executes the selected unpacker module which generates an unpacked executable corresponding to the packed executable.

In accordance with further aspects of the present invention, a method for determining whether incoming data is malware is presented. Incoming data directed to a computing device is intercepted. A determination is made as to whether the incoming data is a packed executable. If the incoming data is determined to be a packed executable, an unpacked executable corresponding to the packed executable is generated. A determination is then made as to whether the packed executable is malware by evaluating whether the unpacked executable is malware.

In accordance with yet further aspects of the present invention, a method for unpacking a packed executable for evaluation as malware is presented. A packed executable is obtained. An unpacker module operable to unpack the packed executable is selected from a set of unpacker modules. The selected unpacker module is executed, thereby generating an unpacked executable corresponding to the packed executable.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 3:
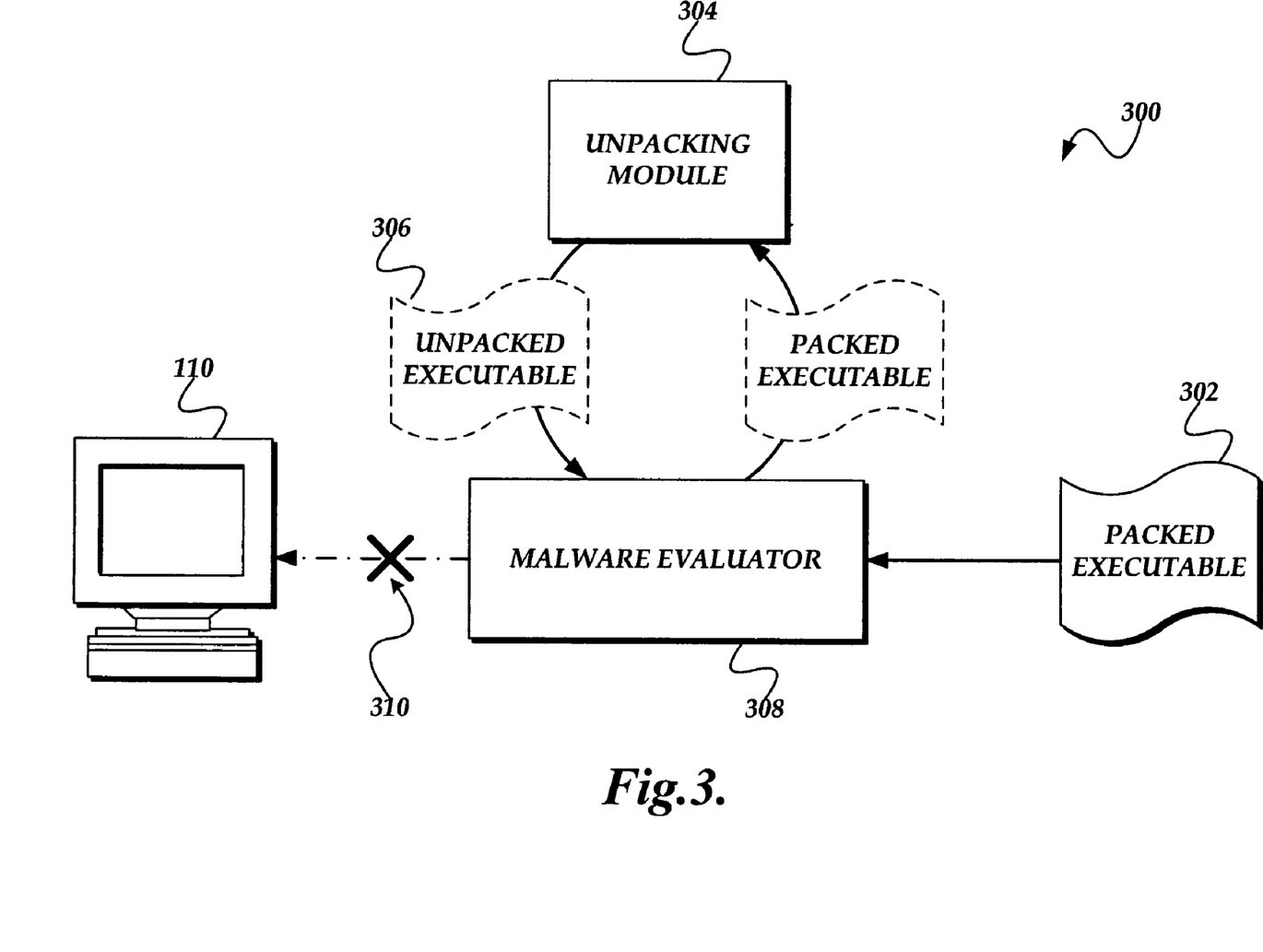
FIG. 3 is a pictorial diagram illustrating an exemplary malware detection environment formed in accordance with aspects of the present invention.

FIG. 3 is a pictorial diagram illustrating an exemplary malware detection environment 300 formed in accordance with aspects of the present invention. The exemplary malware detection environment 300 includes a malware evaluator 308 and an unpacking module 304. In operation, the malware evaluator 308, in conjunction with the unpacking module 304, protects the computer 110 by preventing malware from reaching the computer. As such, one example of a malware evaluator 308 is anti-virus software 104 (FIGS. 1A and 1B) specially adapted to operate in conjunction with the unpacking module 304. Another excellent example of a malware evaluator 308 is found in co-pending and commonly assigned patent application "System and Method for Detecting Malware in an Executable Code Module According to Code Module's Exhibited Behavior." The malware detection system 308 protects the computer 110 by determining whether incoming data, including the packed executable 302, is malware, and if so, prevents the malware from reaching the computer, as indicated by arrow 310.

As shown in FIG. 3, the malware evaluator 308 intercepts the packed executable 302 before it reaches the computer 110. It should be understood that while the malware evaluator 308 may intercept the packed executable 302 as it is routed to the computer over a network 106 (FIG. 1A), the malware evaluator 308 may also operate to intercept the packed executable 302 when encountered on distributable media (not shown), such as a floppy disk, a flash memory storage device, a CD-ROM disk, magnetic tape, and the like.

According to one aspect of the present invention, the malware evaluator 308 first may attempt to identify the packed executable 302 as malware. For example, anti-virus software 104, as well as other malware detection systems, identifies known malware by signatures found in the malware. Thus, if the packed executable 302 has already been identified as known malware, the packed executable could be quickly identified as malware, and it would be unnecessary to unpack the packed executable. However, if the packed executable 302 is not identifiable as known malware, and after determining that the packed executable 302 is a packed executable, the malware evaluator 308 delivers the packed executable 302 to the unpacking module 304. The unpacking module 304 returns the original, unpacked executable 306 to the malware evaluator 308 where it is evaluated to determine whether the packed executable 302 is malware.

According to alternative aspects of the present invention, upon intercepting the packed executable 302, the malware evaluator 308 immediately identifies that the packed executable 302 is a packed executable, and delivers the packed executable to the unpacking module 304 in order to obtain the corresponding unpacked executable 306. Upon receiving the unpacked executable 306, the malware evaluator 308 evaluates the unpacked executable to determine whether the packed executable 302 is malware.

As mentioned, upon receiving the packed executable 302, the unpacking module 304 unpacks the packed executable. In accordance with the present invention, the unpacking module 304 unpacks the packed executable 302 without executing the packed executable, i.e., without the use of the loader/unpacker segment 202 of the packed executable. Instead, the unpacking module 304 includes unpacker modules, and selects an unpacker module specifically designed to unpack the particular type of the packed executable. A more detailed description of the unpacking module 304 and its unpacker modules is provided below in regard to FIG. 5. After generating the unpacked executable 306 from the packed executable 302, the unpacking module 304 returns the unpacked executable to the malware evaluator 308 for processing, as described above.

Figure 4A:
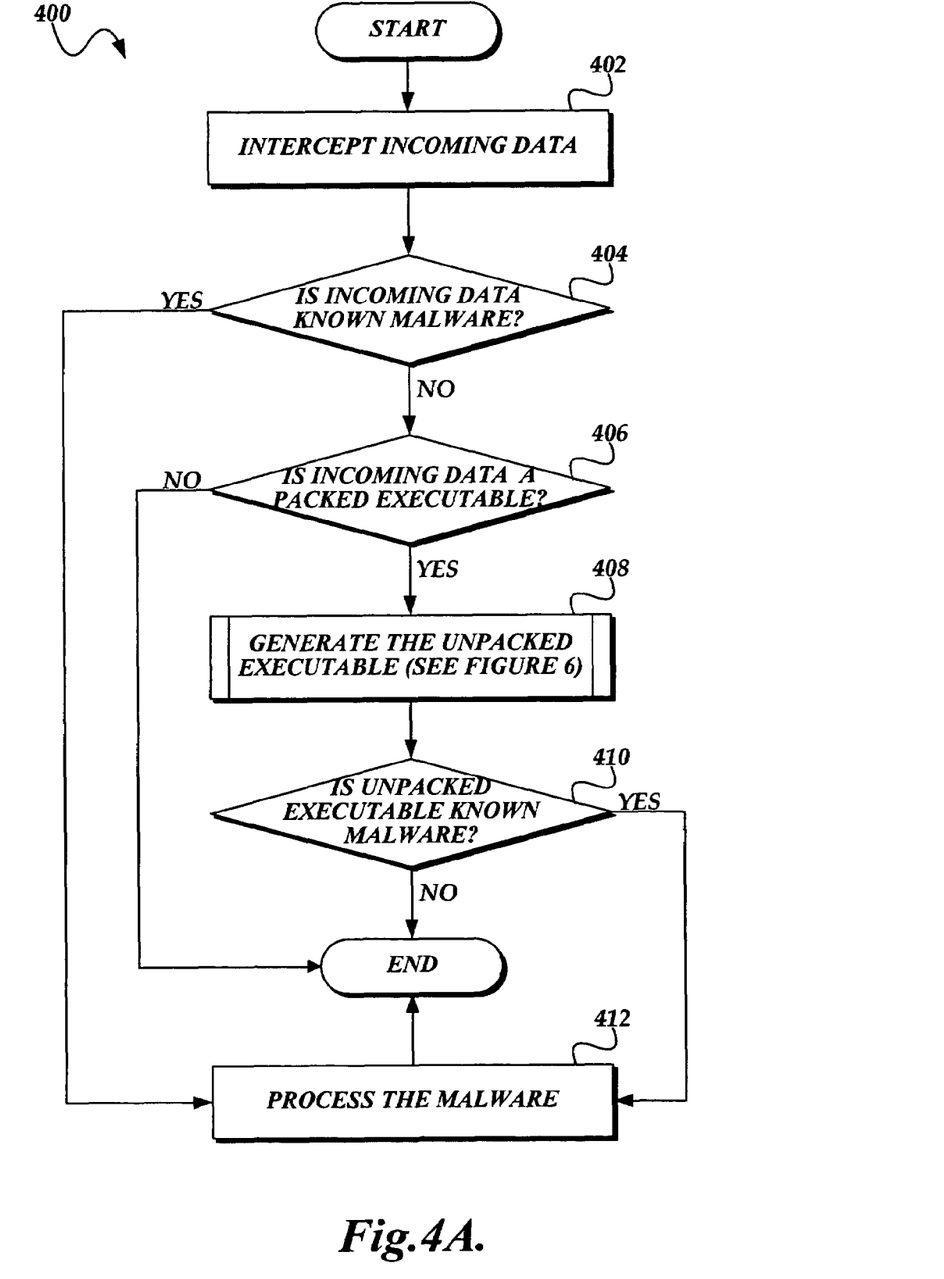
FIGS. 4A and 4B are flow diagrams illustrating exemplary routines for determining whether an executable file is malware, in accordance with aspects of the present invention.

FIG. 4A is a flow diagram illustrating an exemplary routine 400 for determining whether incoming data is malware, in accordance with aspects of the present invention. Beginning at block 402, the incoming data, such as the packed executable 302, is intercepted. At decision block 404, a determination is made as to whether the incoming data is known malware. If the incoming data is determined to be known malware, at block 412, the incoming data is processed as known malware. As mentioned above, processing known malware may entail deleting the incoming data/malware, removing the malware infected portion from the incoming data, quarantining the malware for subsequent user action, and the like. Thereafter, the exemplary routine 400 terminates.

Alternatively, if the incoming data is not determined or identified as malware, at decision block 406, another determination is made as to whether the incoming data is a packed executable 302. If the incoming data is not a packed executable 302, then for purposes of the exemplary routine 400, the incoming data is not malware, and the routine terminates. However, if the incoming data is a packed executable 302, at block 408, the unpacked executable 306 corresponding to the packed executable is generated. Generating the unpacked executable 306 is described below in regard to FIG. 6.

After having generated the unpacked executable 306, at decision block 410, a determination is made as to whether the unpacked executable is known malware. If the unpacked executable 306 is not determined to be known malware, the exemplary routine 400 terminates. However, if the unpacked executable 306 is determined to be known malware, at block 412, the unpacked executable is processed as malware, whereafter the routine 400 terminates.

Figure 4B:
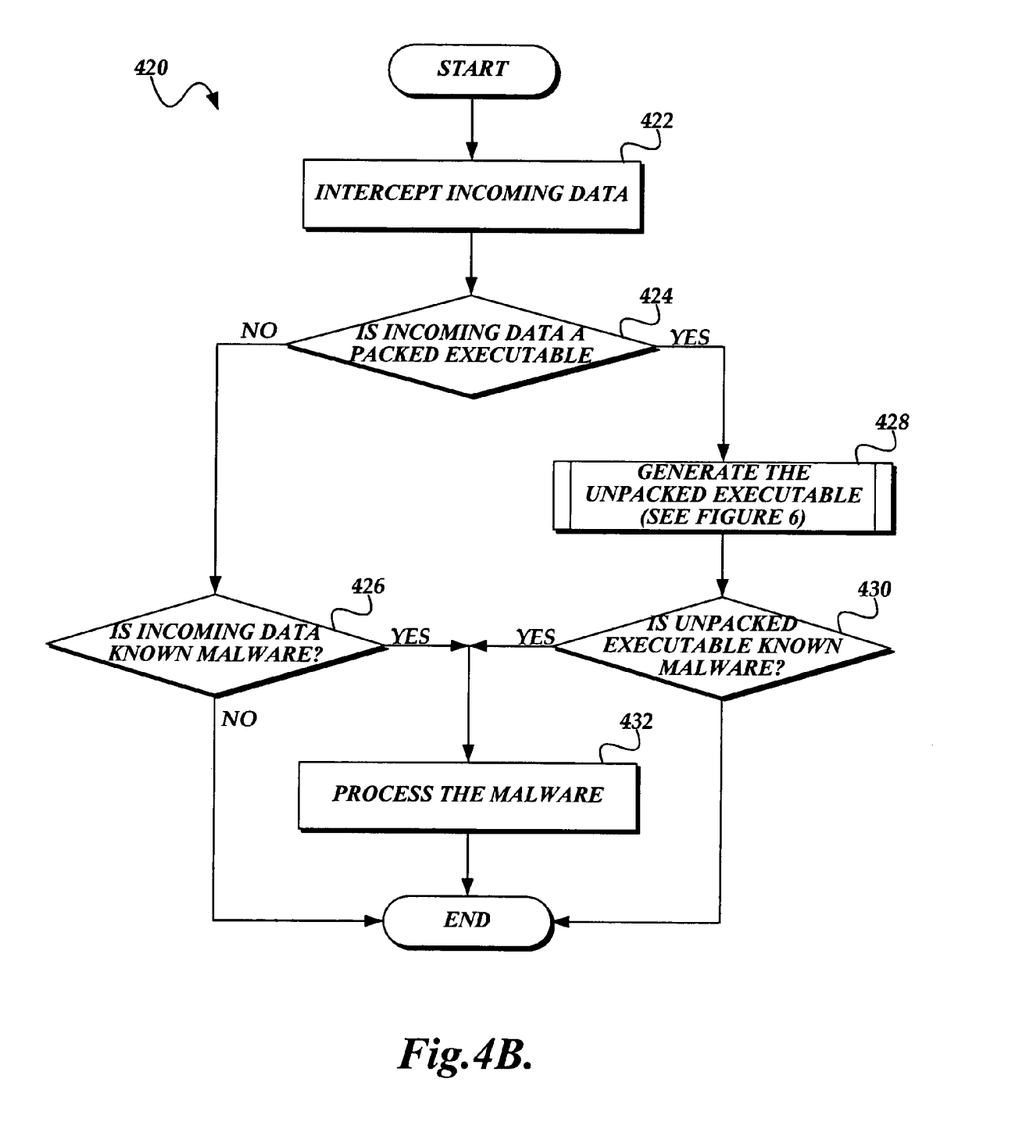

FIG. 4B is a flow diagram illustrating an alternative, exemplary routine 420 for determining whether incoming data is malware, in accordance with aspects of the present invention. Beginning at block 422, the incoming data, such as the packed executable 302, is intercepted. At decision block 424, a determination is made as to whether the incoming data is a packed executable 302. If the incoming data is not a packed executable 302, at decision block 426, a determination is made as to whether the incoming data is known malware. If the incoming data is determined to be known malware, at block 432, the incoming data is processed as known malware. Thereafter, or alternatively, if at decision block 426, the incoming data is not determined to be known malware, the routine 420 terminates.

Alternatively, if at decision block 424, the incoming data is determined to be a packed executable 302, the exemplary routine 420 proceeds to block 428. At block 428, the incoming, packed executable 302 is delivered to the unpacking module 304, where an unpacked executable 306, corresponding to the packed executable, is generated and returned. Unpacking a packed executable 302 and returning a corresponding unpacked executable 306 is described below in regard to FIG. 6. After generating the unpacked executable 306, at decision block 430, a determination is made as to whether the unpacked executable is known malware. If the unpacked executable 306 is determined to be known malware, at block 432, the packed executable 302 is processed as known malware. Thereafter, or alternatively, if at decision block 430 the unpacked executable 306 is not determined to be known malware, the routine 420 terminates.

Figure 5:
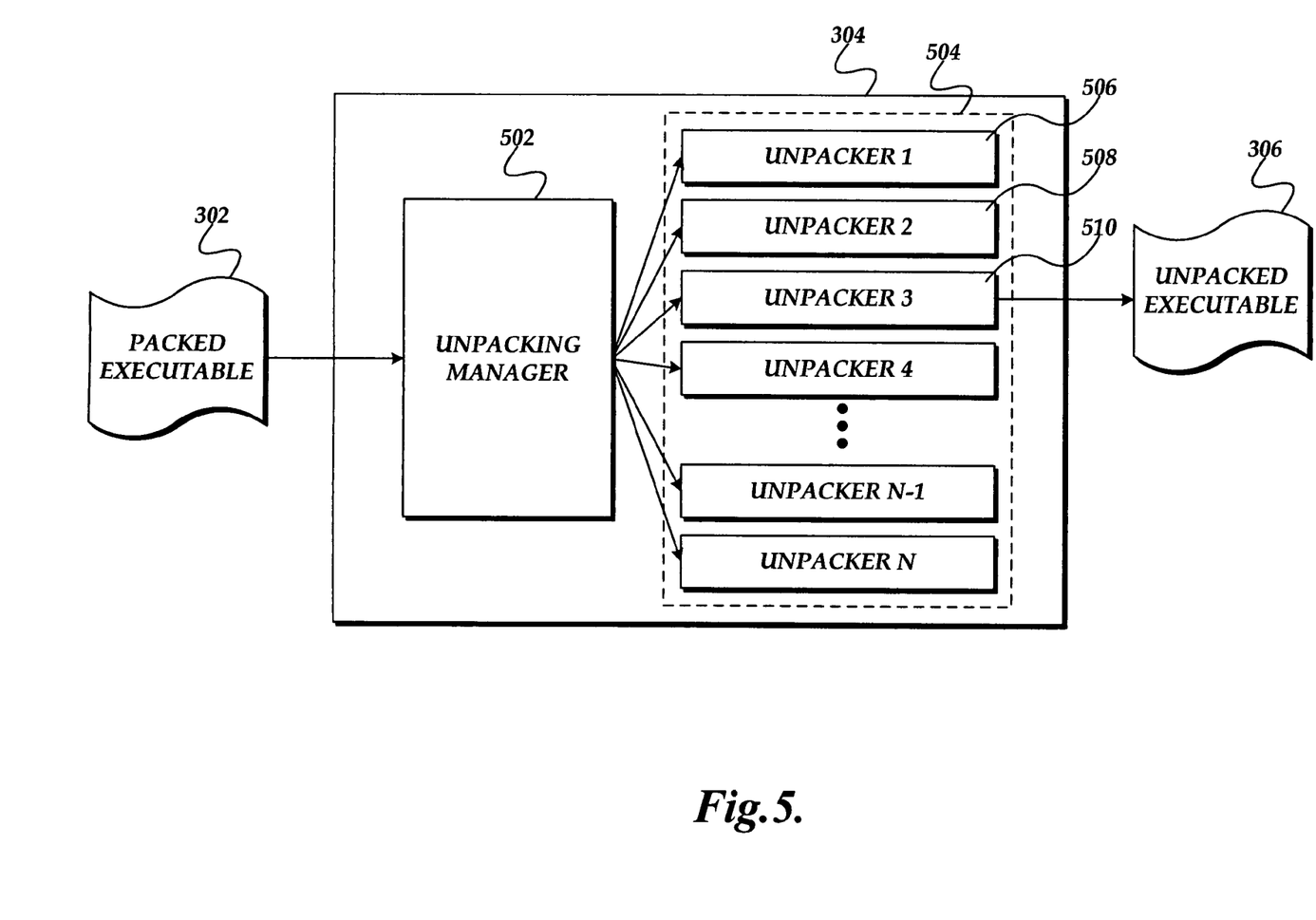
FIG. 5 is a block diagram illustrating an exemplary unpacking module for unpacking a packed executable for further evaluation by a malware evaluator in order to determine whether the packed executable is malware.

FIG. 5 is a block diagram illustrating an exemplary unpacking module 304 for unpacking a packed executable 302 for evaluation by a malware evaluator 308 in order to determine whether the packed executable is malware. As illustrated in FIG. 5, the exemplary unpacking module 304 includes an unpacking manager 502 and a set of unpacker modules 504 that include at least one unpacker module. As shown in the exemplary FIG. 5, the unpacker set 504 includes numerous unpacker modules, including unpacker module 1 506, unpacker module 2 508, and unpacker module 3 510.

Each unpacker module in the unpacker set 504 is an executable code segment for unpacking a packed file, and in particular a packed executable 302, of a particular format. For example, unpacker module 1 506 may be implemented to unpack a "UPX" file, unpacker module 2 508 may be implemented to unpack a "Pklite" file, unpacker module 3 510 may be implemented to unpack a "Uuencoded" file, and so forth. Unpacker modules for these packed executable formats, as well as others known in the art, may be included in the unpacking module 304.

According to aspects of the invention, one of the advantages made available by the present invention is that the unpacker modules are installable modules to the unpacker module 304. As such, the unpacking module 304 is extensible, able to support new packed executable formats by installing a corresponding unpacker module. Similarly, when an existing packed format is updated, the existing unpacker module corresponding to that format may be simply replaced with an updated unpacker module.

According to one embodiment, each unpacker module in the unpacker set 504 must present a standard set of interface routines, collectively referred to as the interface, to the unpacking manager 502, and through which the unpacking manager selects the appropriate unpacker module for unpacking the packed executable 302. According to one embodiment, this standard interface includes the following interface routines: an "is Mine" interface routine which, when called, returns a yes or no value as to whether the unpacker module is able to unpack the packed executable 302; and an "unpack" interface routine which, when called, unpacks the packed executable 302 and returns a corresponding unpacked executable 306. Optionally, the standard interface includes a third interface routine: a "release" interface routine. The "release" interface routine releases system resources allocated to the unpacker module during the unpacking process.

In operation, the unpacking manager 502 selects an unpacker module from the unpacker set 504 according to the type of packed executable 302. According to one embodiment, the unpacking manager 502 selects the appropriate unpacker module by iteratively calling the "isMine" interface routines of each unpacker module in the unpacker module 504 until an unpacker module, such as unpacker module 3 510, responds affirmatively, indicating that the unpacker module is able to unpack packed executables of the packed executable 302 type. After selecting an unpacker module capable of unpacking the packed executable 302, the unpacking manager 502 executes the selected unpacker module to unpack the packed executable. As shown in FIG. 5, the packed executable 302 is delivered by the unpacking manager 502 to the unpacker module 3 510, which generates the unpacked executable 306.

Figure 6:
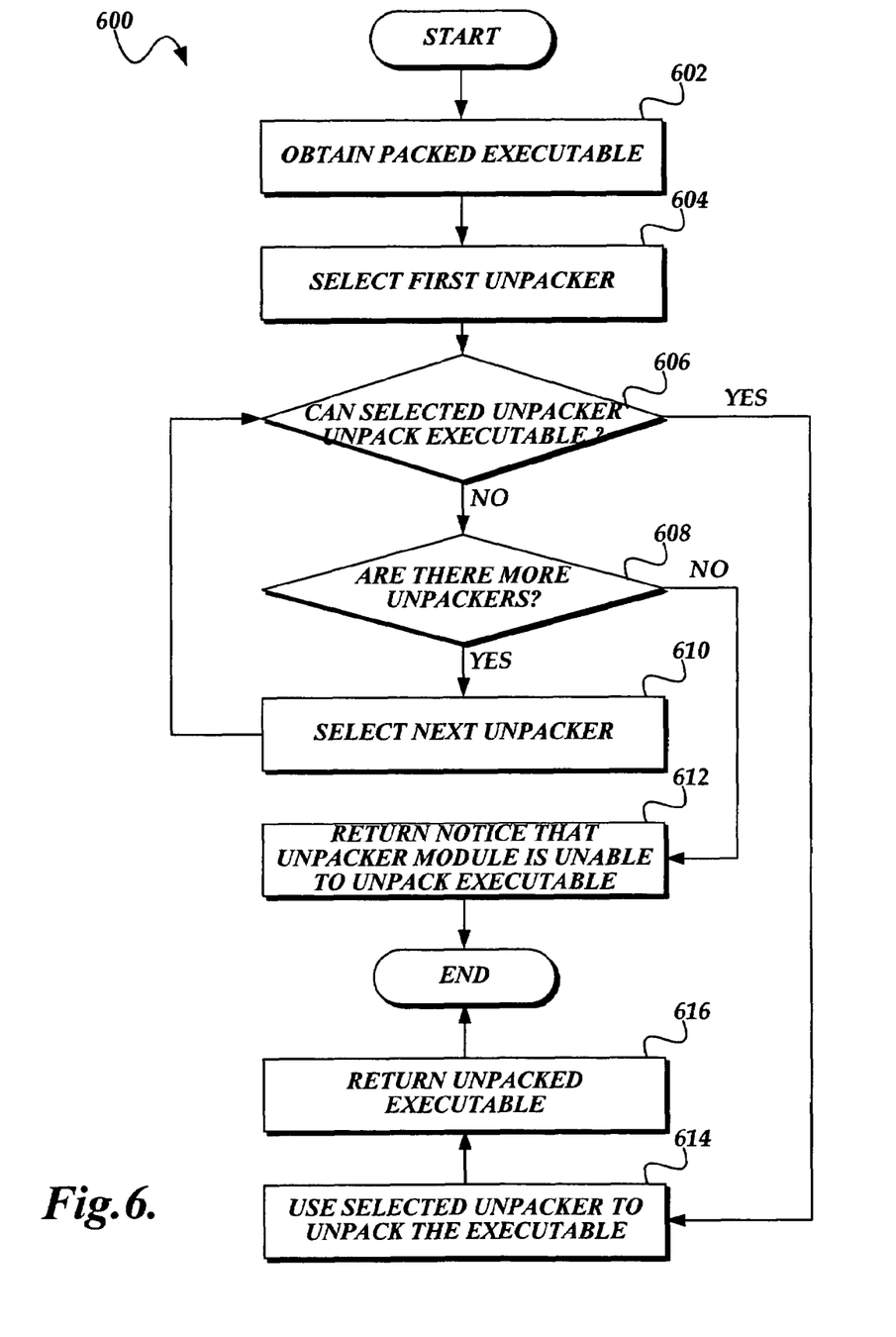
FIG. 6 is a flow diagram illustrating an exemplary routine for unpacking a packed executable for further evaluation by a malware evaluator in order to determine whether the packed executable is malware.

FIG. 6 is a flow diagram illustrating an exemplary routine 600 for unpacking a packed executable 302 for further evaluation by a malware evaluator 308 in order to determine whether the packed executable is malware. Beginning at block 602, the unpacking module 304 obtains the packed executable 302. At block 604, a first unpacker module in the unpacker set 504 is selected. At decision block 606, a determination is made as to whether the selected unpacker module is able to unpack the packed executable 302. As mentioned above, according to aspects of the present invention, the unpacking manager 502 determines whether the selected unpacker module is able to unpack the packed executable 302 by calling the unpacker module's "isMine" interface routine, and evaluating the returned value.

If, at decision block 606, the selected unpacker module is unable to unpack the packed executable 302, the routine 600 proceeds to decision block 608. At decision block 608, a further determination is made as to whether there are any additional unpacker modules in the unpacker set 504. If there are additional unpacker modules to select, at block 610, the next unpacker module in the unpacker set 504 is selected, and the routine 600 returns again to decision block 606 to determine whether the newly selected unpacker module is able to unpack the packed executable 302. Alternatively, at decision block 608, if there are no remaining unpacker modules in the unpacker set 504, the routine 600 proceeds to block 612, where a notice is returned that the unpacker module 304 is unable to unpack the packed executable 302. Thereafter, the routine 600 terminates.

Returning again to decision block 606, if the selected unpacker module is able to unpack the packed executable 302, at block 614, the selected unpacker module is executed, thereby unpacking the packed executable 302 and generating the corresponding original, unpacked executable 306. At block 616, after having generated the unpacked executable 306, the unpacked executable is returned, and the routine 600 terminates.

Figure 7:
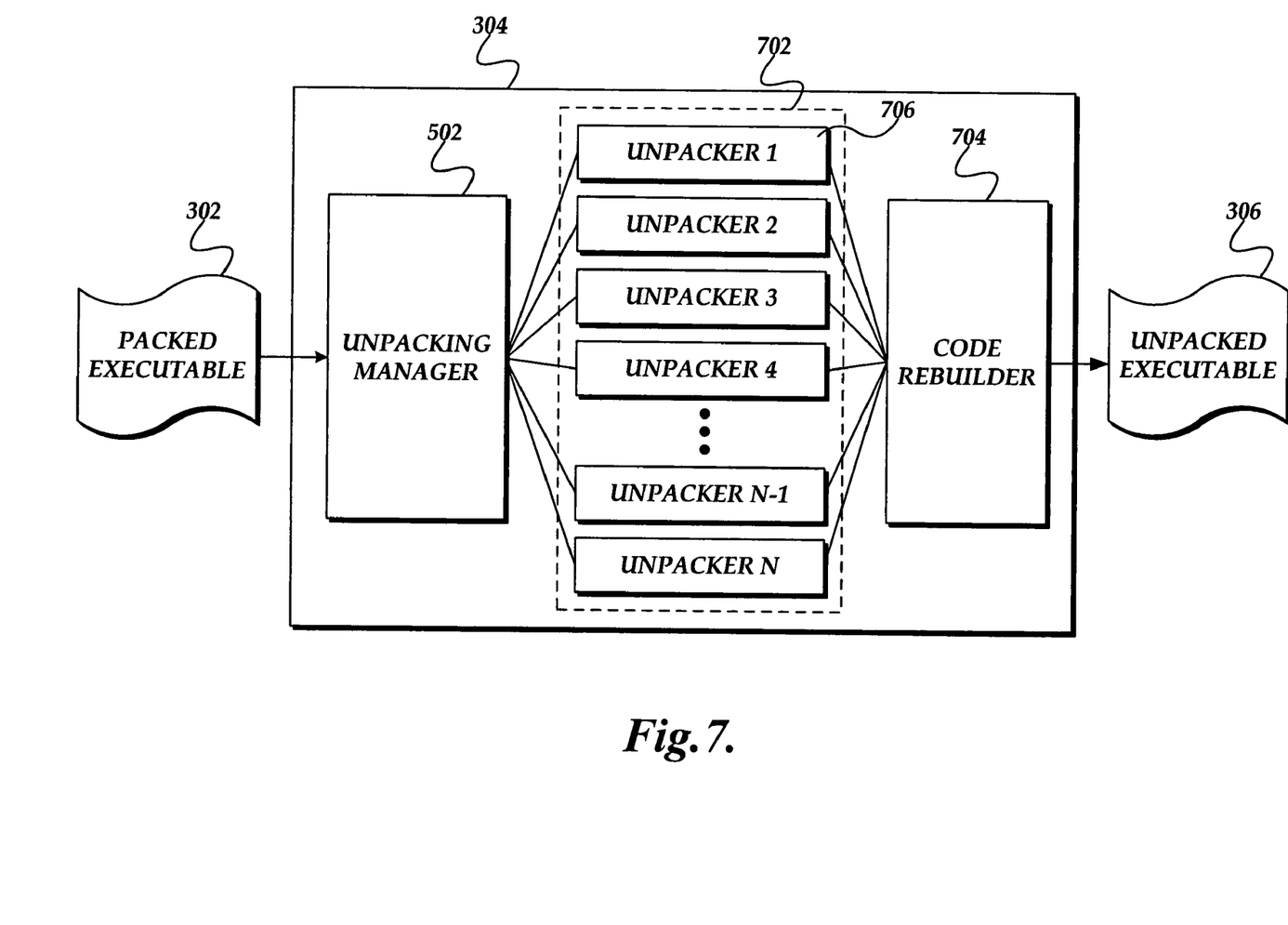
FIG. 7 is a block diagram illustrating an alternative unpacker module for unpacking a packed executable for further evaluation by a malware evaluator in order to determine whether the packed executable is malware.

FIG. 7 is a block diagram illustrating an alternative unpacking module 304 suitable for implementing aspects of the present invention. Similar to the unpacker module 304 described above in regard to FIG. 5, the alternatively embodied unpacking module 304 includes an unpacking manager 502 that selects an unpacker module for unpacking the packed executable 302. Also similarly, the unpacking module 304 includes an unpacker set 702 including at least one unpacker module. However, the unpacker modules in the unpacker set 702 are not the same as the unpacker modules in the unpacker set 504 of FIG. 5.

As those skilled in the art will recognize, the various executable files are organized according to a standardized format. For example, any executable file generated for execution on Microsoft Corporation's Windows environment is organized in a standard format. Similarly, an executable file generated for execution on Microsoft Corporation's .NET environment is organized according to a different format. Each executable file is organized according to the format required by the target platform. While the packed code/data area 204 of a packed file 200 does not immediately reflect the targeted platform's executable file format, the unpacked executable file is restored to the original format. As such, each unpacker module in the unpacker set 504 (FIG. 5) will likely include similar code for reconstructing the packed code/data area 204 according the executable's standard format.

In light of the similarities of executable construction code in unpacker modules, and according to an alternative embodiment of the present invention, the common reconstruction code is extracted from the unpacker modules and centralized in a code rebuilder 704 in the unpacking module 304. In other words, while each unpacker module in the unpacker set 702 is encoded to unpack a particular type of packed executable, the common reconstruction code for organizing the unpacked information into an executable is centralized in the code rebuilder 704.

Each unpacker module, such as unpacker module 1 706, in the unpacker set 702 exposes an additional interface to the code rebuilder 704, by which the code rebuilder and unpacker module collectively operate to unpack the packed executable 302. This additional interface is referred to as a callback routine. In operation, when an unpacker module, such as unpacker module 706 is executed to unpack the packed executable 302, the unpacker proceeds by launching the code rebuilder 704 and responding to the code rebuilder's calls to the callback routines in the additional standard interface. In this manner, the code rebuilder 704 rebuilds the unpacked executable 306 using the selected unpacker module.

According to one embodiment of the present invention, each unpacker module in the unpacker set 702 implements the following callback routines: "processSection" interface routine for processing sections of a packed executable 302; "processHeader" interface routine for processing executable headers in a packed executable; "shouldUnpack" interface routine for determining whether the current section should be unpacked; "unpackSection" interface routine for unpacking an identified section of the packed executable 302; "fixRelocations" interface routine for fixing any relocation values in a current section; "fixImports" interface routine for fixing any imported values in the current section; and "fixResources" interface routine for fixing resources pointers in the current section.

According to yet another embodiment, not all of the callback routines are required to be implemented. If one of the callback routines is not implemented by the unpacker module in the callback interface, it is assumed that the particular processing associated with that callback interface routine, such as fixing relocations in a current section, is always unnecessary.

Ultimately, the result of the cooperation between the code rebuilder 704 and the selected unpacker module, such as unpacker module 1 706, is that the combination creates/generates the unpacked executable 306, for evaluation by the malware evaluator 308 to determine whether the packed executable 302 is malware.

While various embodiments, including the preferred embodiment, of the invention have been illustrated and described, it will be appreciated that various changes can be made therein without departing from the spirit and scope of the invention.

The embodiments of the invention in which an exclusive property or privilege is claimed are defined as follows:

1. A computer implemented system for determining whether a packed executable is malware, the system comprising:
    A processor;
    a malware evaluator for determining whether incoming data is malware, wherein the incoming data directed to a computing device is intercepted by the malware evaluator; and
    an unpacking module that receives a first packed executable from the malware evaluator and returns a corresponding substitute unpacked executable, without executing the first packed executable during unpacking, the unpacking module comprising:
    at least one substitute unpacker code segment, corresponding to a first unpacker code segment of the first racked executable, such that an appropriate substitute unpacker code segment is substituted for the first unpacker code segment of the received first racked executable to facilitate unpacking the first packed executable according to the substitute unpacker code rather than according to the first unpacker code, the first racked executable is thereby unpacked into a corresponding substitute unpacked executable that can be the same as, or different than, a first unpacked executable unpacked if the first packed executable were unpacked by the first unpacker code;
    an unpacking manager, wherein the unpacking manager, upon obtaining the first packed executable, selects the unpacking module for a set of unpacking module to unpack the first packed executable according to a type of the first racked executable, and executes the selected unpacking module which generates the first unpacked executable corresponding to the first packed executable,
    wherein the malware evaluator, upon receiving incoming data, can at least in part determine whether the incoming data is a packed executable, and if so, the malware evaluator provides the packed executable to the unpacking module such that a substitute unpacked executable, corresponding to the first packed executable, is generated by unpacking the first packed executable with a substitute unpacker code segment without executing the first packed executable, whereby the malware evaluator can determine whether the first unpacked executable would be malware based at least in part on an analysis of the corresponding substitute unpacked executable.

2. A computer-implemented method for determining whether incoming data is malware, wherein the method is implemented by a computing device having a processor, the method comprising:
    intercepting incoming data directed to the computing device having a processor;
    determining whether the incoming data is a packed executable; and if the incoming data is a packed executable:
    accessing at least one substitute unpacker code segment corresponding to a first incoming packed executable of the incoming data;
    substituting the substitute unpacker code segment for a first unpacker code segment of the first packed executable;
    generating a substitute unpacked executable employing the substitute unpacker code segment, the substitute unpacked executable corresponding to a first unpacked executable that would result from unpacking the first packed executable with the first unpacker code; and
    determining whether the first incoming packed executable is malware by evaluating whether the corresponding substitute unpacked executable includes malware.

3. The system of claim 1, wherein the returned substitute unpacked executable corresponding to the packed first executable is based at least in part on code or data derived from employing the substitute unpacker code rather than the loader/unpacker received with the first packed executable.

4. The system of claim 3, wherein the employed substitute unpacker code is selected from a group of at least one modularized substitute unpacker modules germane to unpacking a first packed executable of a particular type and further germane to unpacking a first packed executable that has been intercepted by the malware evaluator.

5. The system of claim 1, wherein the intercepted incoming data resides only in one or more logically or physically isolated memory stores such that the intercepted incoming data can be located at a computer but does not actually "reach" the computer.

6. The system of claim 5, wherein the one or more isolated memory stores comprise at least one of a floppy disk, a flash memory storage device, magnetic tape, or combinations thereof.

7. The system of claim 1, wherein the corresponding substitute unpacked executable generated by the unpacking module corresponds to a complete first packed executable and not just a portion thereof.

8. The system of claim 7 wherein the corresponding generated substitute unpacked executable corresponding to a complete unpacked executable is unpacked without executing any portion thereof.

9. The system of claim 1, wherein the malware evaluator determines whether the incoming data is malware without unpacking the incoming data if the incoming data is determined not to be a packed executable.

10. The system of claim 1, wherein the incoming data can be intercepted from at least one data source including a computer network, or distributable media further including a floppy disk, a flash memory storage device, a CD-ROM disk, a magnetic tape, or combinations thereof.

11. The system of claim 1, further comprising, first determining whether the incoming data is known malware before determining if the incoming data is a packed executable, and if not, then determining if the incoming data is a packed executable.

12. The system of claim 11, wherein anti-virus software can be employed in determining whether the incoming data is malware.

13. The system of claim 12, wherein the determining by anti-virus software can be by signature or pattern recognition processes.

14. An electronic device comprising the system of claim 1, such that the electronic device can be placed between a network and a computer device to facilitate intercepting data directed to a computing device.

15. The method of claim 2, further comprising, first determining whether the incoming data is known malware before determining if the incoming data is a packed executable.

16. The method of claim 2, wherein generating a corresponding substitute unpacked executable at least in part employs a substitute unpacker code segment other than the loader/unpacker received with the first packed executable.

17. The method of claim 16, wherein the employed substitute unpacker code is selected from a group of at least one modularized substitute unpacker modules germane to unpacking a first packed executable of a particular type and further germane to unpacking a first packed executable that has been intercepted.

18. The method of claim 2, wherein intercepting incoming data intercepts data as it arrives at the computing device from a network or a distributable media.

19. The method of claim 2, wherein generating the corresponding substitute unpacked executable occurs without executing any portion of the unpacked executable.

20. The method of claim 2, wherein the corresponding unpacked executable corresponds to a complete first packed executable and not just a portion thereof.

* * * * *

UNITED STATES PATENT AND TRADEMARK OFFICE
CERTIFICATE OF CORRECTION

PATENT NO. : 7,620,990 B2
APPLICATION NO. : 10/769103
DATED : November 17, 2009
INVENTOR(S) : Daniel M. Bodorin et al.

Page 1 of 1

It is certified that error appears in the above-identified patent and that said Letters Patent is hereby corrected as shown below:

In column 9, line 11, in Claim 1, delete "A" and insert -- a --, therefor.

In column 9, line 22, in Claim 1, delete "racked" and insert -- packed --, therefor.

In column 9, line 25, in Claim 1, delete "racked" and insert -- packed --, therefor.

In column 9, line 28, in Claim 1, delete "racked" and insert -- packed --, therefor.

In column 9, line 37, in Claim 1, delete "racked" and insert -- packed --, therefor.

In column 9, line 39, in Claim 1, delete "executable," and insert -- executable; --, therefor.

Signed and Sealed this
Eighth Day of February, 2011

David J. Kappos
*Director of the United States Patent and Trademark Office*